(12) United States Patent
Jung

(10) Patent No.: US 7,627,937 B2
(45) Date of Patent: Dec. 8, 2009

(54) MILLING AND DRILLING MACHINE COMPRISING A PALLET EXCHANGER

(75) Inventor: Robert Jung, Pfronten (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 0 days.

(21) Appl. No.: 12/285,354

(22) Filed: Oct. 2, 2008

(65) Prior Publication Data
US 2009/0110505 A1    Apr. 30, 2009

(30) Foreign Application Priority Data
Oct. 9, 2007    (DE)  .................. 20 2007 014 117 U

(51) Int. Cl.
*B23Q 7/00*    (2006.01)
(52) U.S. Cl. ............... 29/33 P; 198/346.1; 29/DIG. 56; 29/DIG. 94; 409/134
(58) Field of Classification Search ............. 29/563, 29/33 P, DIG. 56, DIG. 94; 198/345.3, 346.1; 409/159, 161, 172, 173, 134, 137
See application file for complete search history.

(56) References Cited

U.S. PATENT DOCUMENTS

| | | | | |
|---|---|---|---|---|
| 3,825,245 | A * | 7/1974 | Osburn et al. ............... | 29/33 P |
| 4,797,052 | A * | 1/1989 | Ohta et al. .................. | 29/33 P |
| 5,992,608 | A * | 11/1999 | Ahn ........................ | 198/346.1 |
| 6,647,605 | B2 * | 11/2003 | Hiramoto et al. ............. | 29/33 P |
| 2002/0175042 | A1 * | 11/2002 | Nishii ...................... | 198/346.1 |
| 2007/0289115 | A1 * | 12/2007 | Kawai et al. ................. | 29/33 P |

FOREIGN PATENT DOCUMENTS

| | | |
|---|---|---|
| DE | 198 53 945 C2 | 9/2000 |
| DE | 197 36 252 C2 | 10/2000 |

OTHER PUBLICATIONS

Machine translation of DE 19853945, which patent was published in Jun. 2000.*

* cited by examiner

*Primary Examiner*—Erica E Cadugan
(74) *Attorney, Agent, or Firm*—Oliff & Berridge, PLC

(57) ABSTRACT

The invention relates to a program-controlled milling and drilling machine comprising a machine column, a machining unit comprising a milling head and being movable along at least one coordinate axis at the front of the machine column, a machine bed disposed in front of the machine column, a work carrier movable on the machine bed along another coordinate axis, and a pallet exchanger arranged at the free end portion of the machine bed, having two spaced apart pallet holders and a rotating and lifting mechanism on a joint load-bearing structure. According to the invention, the load-bearing structure of the pallet exchanger is laterally arranged next to the machine bed and has a dimensionally stable and sturdy transverse arm extending across the machine bed and supporting the rotating mechanism, the lifting mechanism in the load-bearing structure laterally arranged next to the machine bed being arranged in a manner so as to protect against dirt by a splashboard.

10 Claims, 4 Drawing Sheets

MILLING AND DRILLING MACHINE COMPRISING A PALLET EXCHANGER

The invention relates to a program-controlled milling and drilling machine comprising a stationary machine column having a machining unit with a milling head movable along at least one coordinate axis at the front of the machine column, a machine bed disposed in front of the machine column, a work carrier travelling on the machine bed along a coordinate axis and a pallet exchanger arranged at the end portion of the machine bed and having two pallet holders and a rotating and lifting mechanism.

For the serial machining of workpieces milling and drilling machines are frequently equipped with pallet exchanges which enable a short-time exchange of the workpieces and thus increase the chip production while reducing non-cutting time. The pallets are loaded with workpieces outside of the machine tool and detachably attached on or at a pallet carrier of a pallet exchanger. In the case of the type of pallet exchanger mentioned here, the pallet is attached by a lowering movement and the engagement of a hook-shaped or claw-shaped pallet carrier thus achieved with a corresponding recess at the outer rim of the pallet. The pallet is positioned above the work table by a rotating movement of the pallet exchanger and, after a lowering movement, clamped onto this table. In the pallet exchangers hitherto used, the lifting mechanism for lifting and lowering the pallets is located inside the protective cabin of the machine tool, having the effect that the individual parts of the lifting mechanism may be soiled by the working fluids and chips located within the cabin. Chip accumulation on the relatively-movable parts of the lifting and rotating mechanism may be the cause of malfunctions and failure occurrences. In manless shift operation, failures of the pallet exchangers inevitably lead to failures of the entire machine.

It is the object of the invention to provide a program-controlled milling and drilling machine comprising a pallet exchanger, wherein the pallet exchanger is not exposed to the influence of falling chips and of soiling by fluids.

According to the invention, this object is achieved by the fact that the load-bearing structure of the pallet exchanger is positioned at the side of the machine bed and has a dimensionally stable transverse arm extending across the machine bed at a vertical distance and supporting the rotating mechanism and that the lifting mechanism is positioned in the lateral load-bearing structure next to the machine bed in a manner so as to protect against dirt.

Due to the lateral positioning of the load-bearing structure of the is pallet exchanger, the access facility of the individual parts of the pallet exchanger from the rear face of the machine bed is improved. Furthermore, the aggregates of the lifting mechanism are protected against chip accumulation and contamination by fluids due to their lateral arrangement next to the machine bed and by providing a protective wall. Moreover, the accuracy requirements when lifting and laying down pallets become less, simplifying the overall operation of the machine and reducing error quota.

According to an advantageous design of the invention, the lifting mechanism of the pallet exchanger contains vertical guides and at least one pressure agent cylinder for lifting and lowering the transverse arm, the guiding elements and the pressure agent cylinder(s), together with a control aggregate for supplying and discharging the pressure agent, being arranged in the load-bearing structure attached to a sidewall of the machine bed.

Suitably, only one single lifting mechanism with vertical guides is provided at one side of the machine bed, connecting one end of the transverse arm. Thus, the transverse arm extends approximately to the center of the machine bed. In this embodiment, the pallet carrier and its rotary drive are mounted to the free end portion of the transverse carrier.

Another advantageous embodiment of the invention is characterized in that the transverse arm spans the machine bed like a bridge and is supported at each end on a respective lifting mechanism laterally arranged next to the machine bed. Each of the two lifting mechanisms suitably contains vertical guides and a pressure agent cylinder, which are synchronously driven via a control aggregate, such that the bridge-like transverse carrier can be uniformly guided together with the pallet carrier supported thereon and its rotary drive and may be lifted and lowered without tilting.

In order to exclude the accumulation of chips and soiling of the lifting mechanisms, each lifting mechanism is advantageously surrounded by a protective housing which is penetrated by the transverse arm in a sealed manner towards the side of the machine bed. The wall of the protective housing facing the machine bed contains movable wall elements which tightly enclose the transverse arm and follow its lifting and lowering movements.

Further advantages and particular features of the inventive milling and drilling machine and its pallet exchanger can be taken from the following description of embodiments by referring to the drawings, wherein.

Figure 1:
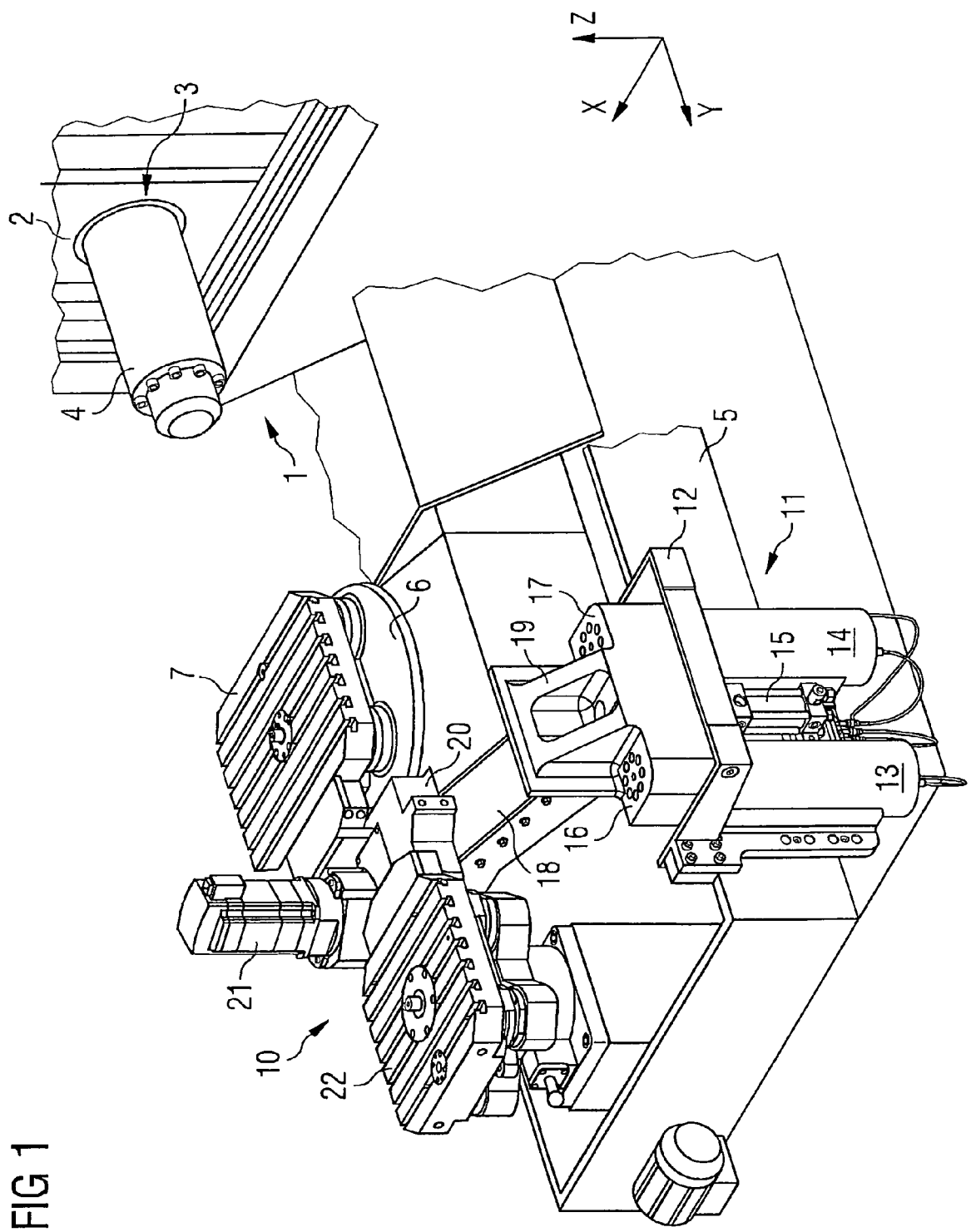
FIG. 1 shows a schematic perspective illustration of essential structural parts of a milling and drilling machine comprising a pallet exchanger according to the invention.
Figure 2:
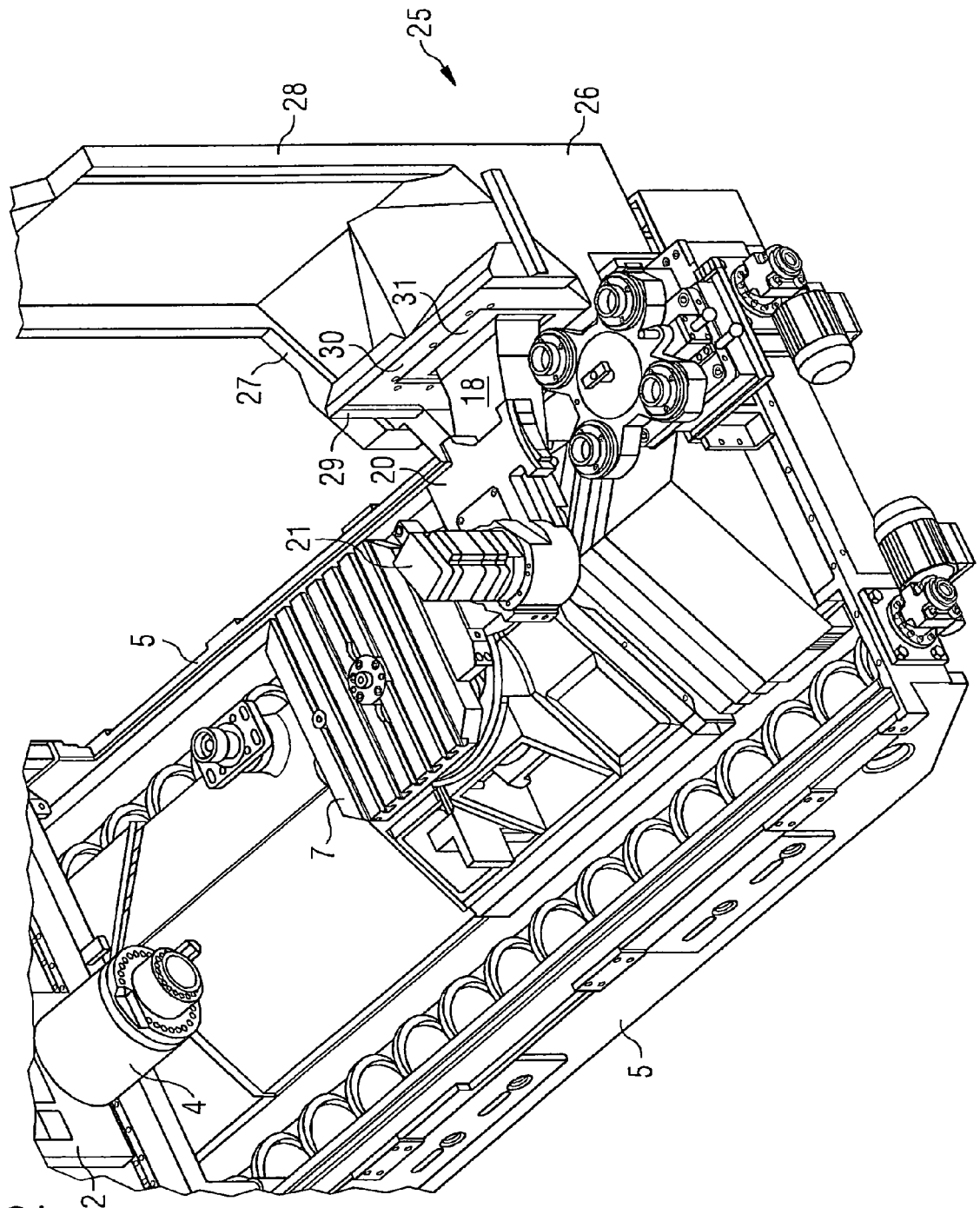
FIG. 2 shows another perspective illustration of the milling and drilling machine comprising the pallet exchanger according to FIG. 1.

The milling and drilling machine illustrated in FIGS. 1 and 2 contains a machine column 1—not shown in detail in the present case—faced with steel sheet frames 2 at the front of which a working unit 3 is arranged comprising a milling head 4 that is horizontal in the present case. The working unit 3 may be moved by means of a motor-driven carriage along the coordinate axes X and Y. A machine bed 5 is disposed in front of the machine structure 1, on which there is a work carrier 6 comprising a work pallet 7. The work carrier 6 together with the pallet 7 can be moved by a motor in the longitudinal direction of the bed, that is, along the coordinate axis Y.

At the left end portion of the bed 5 in FIG. 1, a pallet exchanger 10 is provided which will be described in more detail below. The pallet exchanger illustrated in detail in FIGS. 1 to 3 contains a lifting mechanism 11 arranged at a side wall of the machine bed 5 and containing a load-bearing structure 12. In this load-bearing structure 12 attached to the sidewall of the machine bed two cylindrical vertical guides 13, 14 are supported which are aligned vertically and parallel to each other towards the sidewall of the machine bed. A pressure agent cylinder 15 is provided between the two vertical guides 13, 14, and its supply and discharge of pressure agents is controlled by the program control of the milling machine. A dimensionally stable transverse arm 18 of approximately rectangular cross-section is fixedly connected via a connecting part 19 to the upper parts 16, 17 of the vertical guides 13, 14, which can be lifted and lowered such that the transverse arm 18 is lifted and lowered by both upper parts 16, 17 when the pressure agent cylinder is pressurized. At the free end of this transverse arm, a pallet carrier 20 is mounted rotatably about a vertical axis, which can be rotated by an electric drive motor 21. This electric motor 21 is also mounted on the free end of the transverse arm 18. The pallet carrier 20 has a respective supporting hook at two opposite sides, which is formed for engagement with a corresponding recess at the respective pallet 7, 22. As can be taken from FIG. 1, a pallet 7 or 22, respectively, is attached to each of the two supporting hooks—not shown—of the pallet carrier, these two pallets 7, 22 being laterally displaced to each other in the direction of the coordinate axis Y, thereby reducing the longitudinal extension of the pallet exchanger.

As can be taken from FIG. 2, the lifting mechanism 11 illustrated in FIG. 1 is accommodated in a closed housing 25 and thus protected against accumulations of chips and fluids. Suitably, this housing 25 is inside the protective cabin—not shown—of the milling and drilling machine or forms a part of this protective cabin. The housing 25 contains sidewalls 26, 27, a raised back wall 28 as well as a protective wall towards the machine bed 5, which contains at least one wall element 31 penetrated by the transverse carrier 18, that tightly encloses the transverse carrier 18 and follows its vertical movements. This wall element 31 can be moved vertically and is formed louver-like compared to the other adjoining wall parts, and it is sealed in every position.

Figure 3:
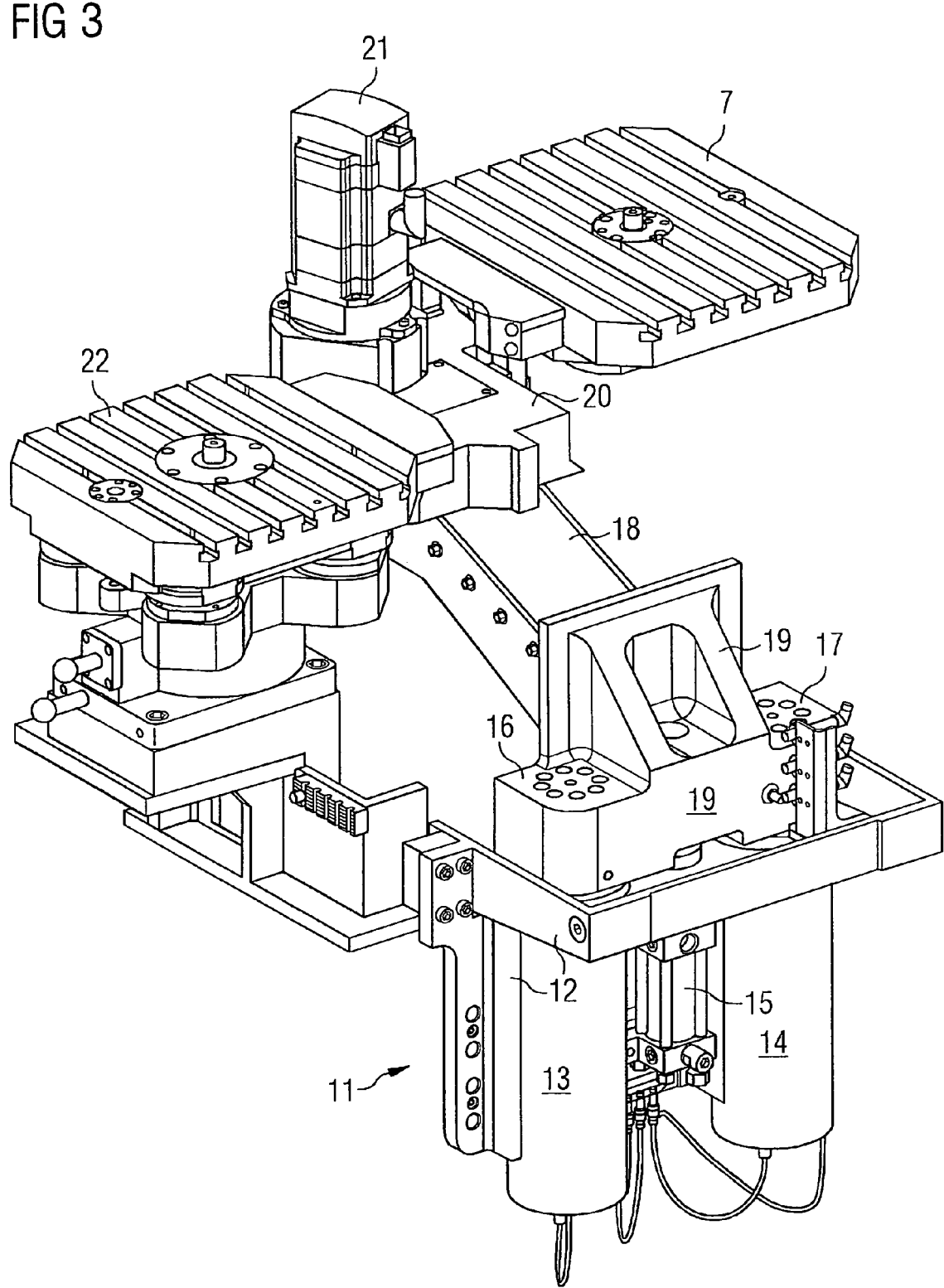
FIG. 3 shows a perspective illustration of the pallet exchanger of the milling and drilling machine according to FIG. 1.
Figure 4:
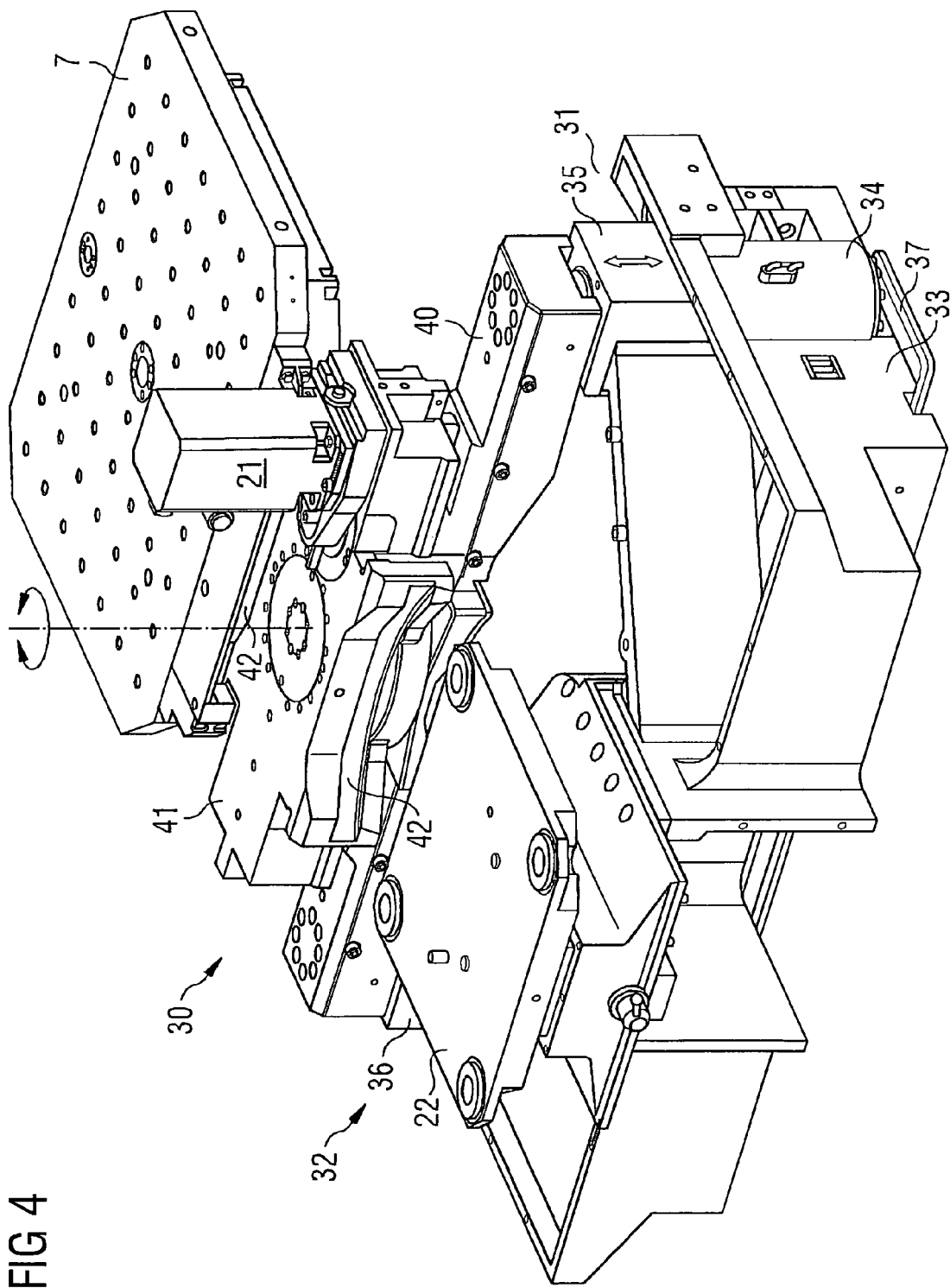
FIG. 4 shows a perspective illustration of another embodiment of the pallet exchanger.

In the embodiment of the inventive pallet exchanger illustrated in FIG. 4 the same components as in the embodiment according to FIGS. 1 to 3 are denoted by the same reference numerals. The pallet exchanger 30 according to FIG. 4 contains two lifting mechanisms 31, 32, one of which being respectively arranged at a longitudinal side of the machine bed. Both lifting mechanisms 31, 32 are of identical structure and contain a load-bearing structure 33 with vertical guides and a pressure agent cylinder 34 fixed therein. The upper part 35, 36 of the respective pressure agent cylinder performs the vertical lifting and lowering movements if pressure agents are supplied to the respective cylinder via the pipes 37. A dimensionally stable transverse carrier 40, on which a pallet carrier 41 having two opposite pallet holders 43, 44 is rotatably arranged, is supported on the upper part 35, 36 of each pressure agent cylinder 34 at the respective end parts thereof. An electric motor 21 mounted on the pallet carrier is used to rotate the pallet carrier also in this embodiment.

In this embodiment as well, both lifting mechanism 31, 32 are laterally arranged next to the machine bed and thus outside of the working space of the milling machine such that they are protected against soiling by chips and fluids. For the purpose of protection against soiling as far as possible, protective walls are provided between the machine bed and the lifting mechanisms 31, 32 also in this embodiment which have vertically slidable wall elements tightly enclosing the end portion of the transverse carrier 40 at the side facing the machine bed.

The invention is not limited to the embodiments as shown. Thus, other constructions of protective walls or protective mechanisms may be used to safely prevent accumulations of chips and fluids at the lifting mechanisms.

The invention claimed is:

1. A program-controlled milling and drilling machine comprising
    a machine column,
    a machining unit comprising a milling head and movable along at least one coordinate axis at the front of the machine column,
    a machine bed disposed in front of the machine column,
    a work carrier movable on the machine bed along another coordinate axis, and
    a pallet exchanger provided at a free end portion of the machine bed, having two spaced apart pallet holders and a rotating mechanism and a lifting mechanism on a joint load-bearing structure, wherein
    the load-bearing structure of the pallet exchanger is positioned at the side of the machine bed and has a dimensionally stable and sturdy transverse arm extending across the machine bed and supporting the rotating mechanism, and
    the lifting mechanism in the load-bearing structure is laterally arranged next to the machine bed and is arranged in a manner so as to protect against dirt by a splashboard.

2. The milling and drilling machine according to claim 1, wherein
    the lifting mechanism of the pallet exchanger has vertical guides and at least one pressure agent cylinder for lifting and lowering the transverse arm.

3. The milling and drilling machine according to claim 2, wherein
    the at least one pressure agent cylinder is arranged in the load-bearing structure attached to a sidewall of the machine bed.

4. The milling and drilling machine according to claim 1, wherein
    the lifting mechanism comprises two parallel vertical guides and a pressure agent cylinder provided at one side of the machine bed, which connect to one end of the transverse arm via a dimensionally stable structural element, and
    the pallet exchanger includes a pallet carrier for the pallet holders, and the rotating mechanism and the pallet carrier are arranged at a free end portion of the transverse arm.

5. The milling and drilling machine according to claim 1, wherein
    the transverse arm spans the machine bed like a bridge and is supported at each end on a respective lifting mechanism laterally arranged next to the machine bed.

6. The milling and drilling machine according to claim 1, wherein
    the rotating mechanism contains an electric motor and has a vertical rotating axis.

7. The milling and drilling machine according to claim 6, wherein the pallet exchanger includes a pallet carrier for the pallet holders, and wherein the electric motor is mounted to the pallet carrier.

8. The milling and drilling machine according to claim 1, wherein
    the two pallet holders are two opposite hook-shaped pallet holders for detachably mounting a respective pallet.

9. The milling and drilling machine according to claim 1, wherein
    the lifting mechanism is surrounded by a protective housing, one sidewall of which is penetrated by the transverse arm towards the side of the machine bed.

10. The milling and drilling machine according to claim 9, wherein
    the sidewall of the protective housing faces the machine bed and contains mobile wall elements which tightly enclose the transverse arm and are sealed against adjoining wall parts.

* * * * *